United States Patent [19]

Bauer et al.

[11] Patent Number: 4,934,493
[45] Date of Patent: Jun. 19, 1990

[54] FRICTIONAL DAMPER

[75] Inventors: Hans J. Bauer; Hans-Peter Bauer; Ludwig Stadelmann, all of Altdorf, Fed. Rep. of Germany

[73] Assignee: Fritz Bauer & Sonne oHG, Altdorf, Fed. Rep. of Germany

[21] Appl. No.: 332,908

[22] Filed: Apr. 4, 1989

[30] Foreign Application Priority Data

Apr. 8, 1988 [DE] Fed. Rep. of Germany ....... 3811742

[51] Int. Cl.⁵ .............................................. F16F 7/08
[52] U.S. Cl. .................................... 188/381; 188/129; 267/151
[58] Field of Search ................... 188/129, 381, 322.22, 188/322.19; 267/64.26, 151

[56] References Cited

U.S. PATENT DOCUMENTS

| | | | |
|---|---|---|---|
| 2,209,603 | 7/1940 | Johnson | 188/322.19 |
| 2,562,595 | 7/1951 | Blue | 188/129 X |
| 3,605,553 | 9/1971 | Panigati | 188/322.22 X |

FOREIGN PATENT DOCUMENTS

| | | | |
|---|---|---|---|
| 2393983 | 2/1979 | France | 188/129 |
| 535048 | 10/1955 | Italy | 188/129 |

Primary Examiner—Duane A. Reger
Attorney, Agent, or Firm—Browdy & Neimark

[57] ABSTRACT

A frictional damper has a tubular housing and a slide which is guided slidably in this housing in the direction of its longitudinal axis. In the area of its end on the slide exit side, the housing is provided with a damping lining which bears against the slide. In order to achieve the setting and maintaining of constant frictional conditions, which can if necessary be varied from one frictional damper to another, at low cost, the damping lining is arranged in a separate damping housing which is inserted into the tubular housing from the end on the slide exit side and is fixed axially at this point in the direction of its longitudinal axis. In an otherwise identical housing and slide the damping housing and/or the damping lining can each have a different design.

20 Claims, 3 Drawing Sheets

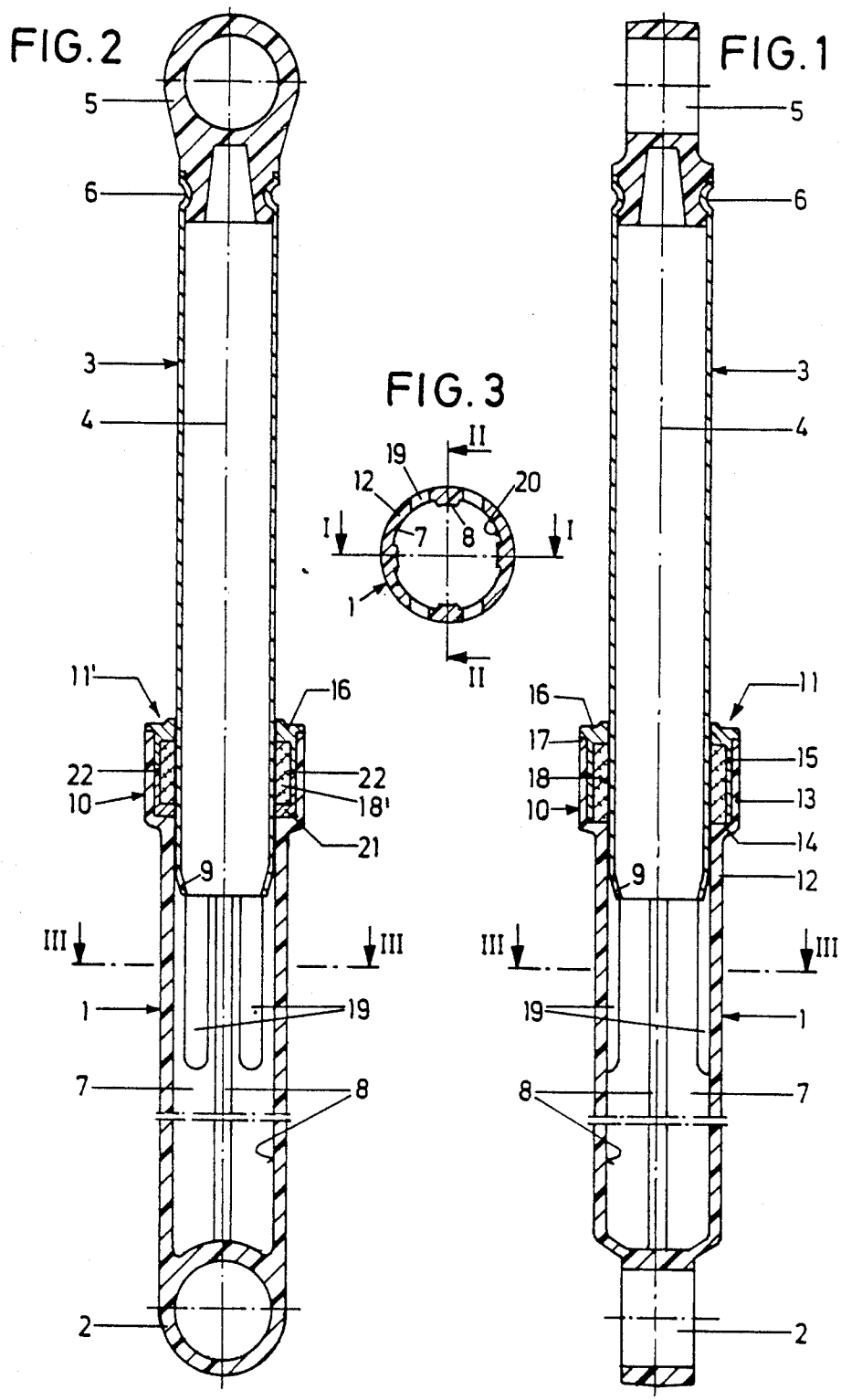

FRICTIONAL DAMPER

FIELD OF THE INVENTION

The invention relates to a frictional damper comprising a tubular housing with a wall and an inner wall and having a slide which is slidably guided in this housing in the direction of its longitudinal axis and projects out of an end thereof, the housing and the slide each being provided with a connecting element at each of their free ends and the housing having a damping lining bearing against the slide in the area of its end on a slide exit side.

BACKGROUND OF THE INVENTION

A frictional damper is known from U.S. Pat. No. 4,765,444 in which the friction lining is made of foamed, closed-cell polyurethane plastic and is attached to the slide. It is preloaded from its outer circumference and bears against the inner wall of the tubular housing while generating frictional forces. Very good constant frictional conditions are achieved with this design. The setting of different frictional forces in otherwise unchanged frictional dampers can only be achieved at a relatively high cost.

In addition, a frictional damper of the type as defined is known in which the tubular housing has, in the area of its end on the slide exit side, an enlarged receiving section which is in turn closed towards the end on the slide side. A damping lining in the form of a strip of foamed plastics material is inserted into this annular-groove like section. The slide is guided along the entire inner wall of the tubular housing. The tubular housing and/or the slide has a vent hole in the area of each free end. This frictional damper is very simple in design; precise frictional conditions cannot be achieved by the type of guidance in combination with the type of damping lining arrangement. Moreover, whistling noises occur during operation. In addition, there is a danger of lubricating grease escaping from the vent hole.

A frictional damper is known from U.S. Pat. No. 3,332,523 in which the housing has, in the area of its end on the piston rod exit side, an enlargement into which a housing is inserted. A frictional sleeve is arranged in this housing and bears against the rod or a cylinder, respectively. Rubber rings or the like are arranged between the sleeve and the housing.

A frictional damper is known from German published patent application No. 22 38 595 comprising a tube and a rod with a guiding disk. The shock absorbing rod is guided in a frictional material provided at the tube end and arranged in a damping housing screwed into the tube.

SUMMARY OF THE INVENTION

It is the object of the present invention to develop a frictional damper of the type as defined, in such a manner that the setting and maintaining of constant frictional conditions, which are if necessary different from one frictional damper to another, can be achieved at a low cost.

The object is attained in accordance with the invention by the damping lining being arranged in a separate damping housing which is inserted into the tubular housing from the end on the slide exit side and being fixed axially in this housing in the direction of its longitudinal axis. By applying the measures according to the invention the damping lining, which is inserted in a separate damping housing or is retained therein, is made to form a separate component which can in each case be designed differently to produce different frictional conditions, but can be fitted into an otherwise identical frictional damper. Thus it is possible in each case to insert into such a damping housing a different damping lining which is either made of different materials having different friction factors from the material of the slide, or which has a different radial extension and thus has a different preloading from the slide. Also, the dimensions of the damping housing can be varied as an alternative or cumulatively so that from there the damping lining is preloaded radially to varying degrees towards the slide. The damping housings can be designed with different colouring in order to simplify storage in this manner. The measures according to the invention make it possible firstly to simplify production for the manufacturer of the frictional damper. Moreover, it is however also possible that the user, for example a washing machine manufacturer, assembles the respective frictional dampers by selecting the appropriate damping housing with a damping lining for the actual application.

When at least three guide webs for the slide, which extend parallel to the longitudinal axis and project radially inwards from the inner wall, are formed on this inner wall of the tubular housing, particularly advantageous frictional conditions are achieved. Such advantage is achieved because frictional conditions, which are precisely defined by the slide guide webs, i.e. are constant from one frictional damper to another, are achieved between the slide and housing, i.e. between the slide and the slide guide means in the housing. Furthermore, it is particularly advantageous in this connection if ventilation slots are formed in the wall of the tubular housing adjacent to the damping housing, which slots run parallel to the longitudinal axis. These ventilation slots are arranged between the guide webs. The arrangement of the ventilation slots immediately adjacent to the damping housing makes it possible, with each stroke of the slide, for the air which streams in and out through the ventilation ducts to stream around the outer wall of the slide, thereby cooling the outer wall. Also, this results in the constant frictional conditions being maintained more precisely over a work cycle while considerable heating can occur as a result of work done by friction. The size of the ventilation slots ensures that whistling noises cannot occur. The damping lining is a soft, compressible material designed preferably in a known manner of closed-cell foamed polyurethane plastics material and its surface is impregnated with a lubricant.

In another fundamental development of the frictional damper the damping housing itself is in the form of a guide housing and has guide faces for the slide on both sides of the damping lining, i.e. it serves as a guide housing for the slide. Particularly in this case it is advantageous, when the damping housing is supported radially in the tubular housing by way of supporting and centering webs, because these centering webs make it possible to adapt to different housing diameters.

Further advantages and features of the invention will become apparent from the ensuing description of exemplary embodiments, taken in conjunction with the drawings.

BRIEF DESCRIPTION OF THE DRAWINGS

FIG. 1 is a longitudinal section through a frictional damper having a damping housing along the line I—I in FIG. 3, FIG. 2 shows a frictional damper identical in its fundamental design to the frictional damper according to FIG. 1 and having a modified damping housing, along the section line II—II in FIG. 3, FIG. 3 is a section through the frictional dampers according to FIGS. 1 and 2, along the section lines III—III in FIG. 1 and FIG. 2.

DESCRIPTION OF THE PREFERRED EMBODIMENTS

Figure 4:
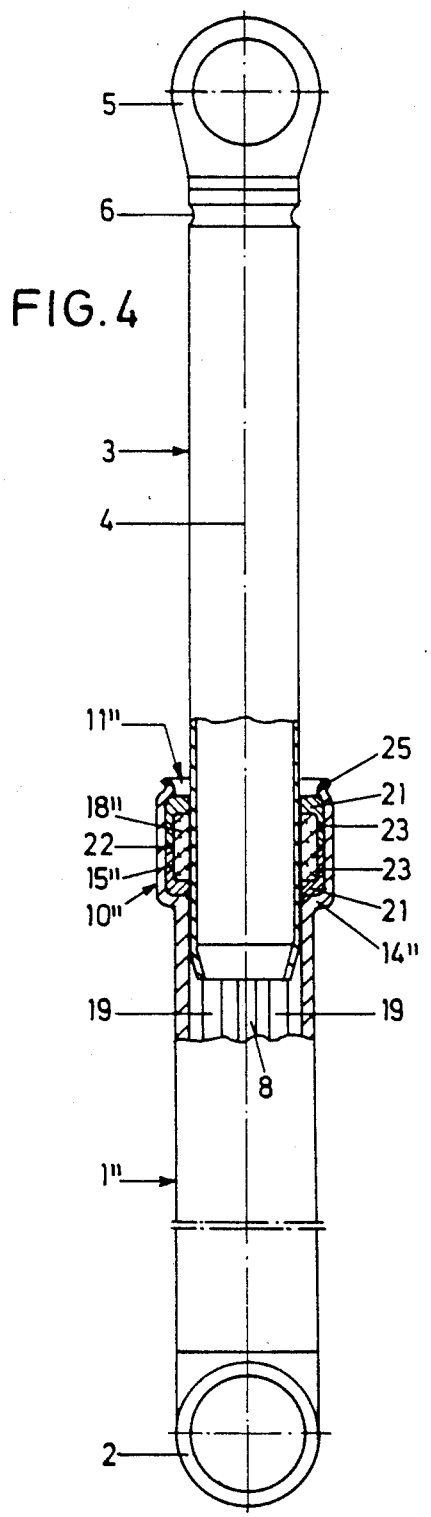
FIG. 4 shows a modified embodiment of a frictional damper with a modified friction housing, in partial longitudinal section.
Figure 6:
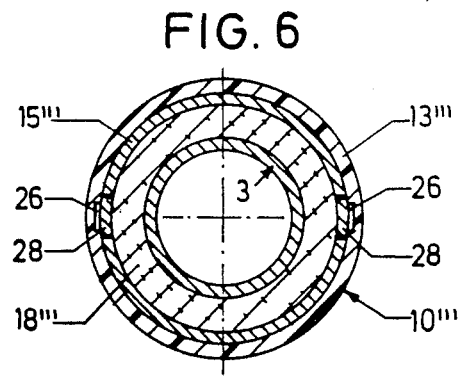
FIG. 6 is a cross-section through the frictional damper according to FIG. 5 along the section line VI—VI in FIG. 5.
Figure 5:
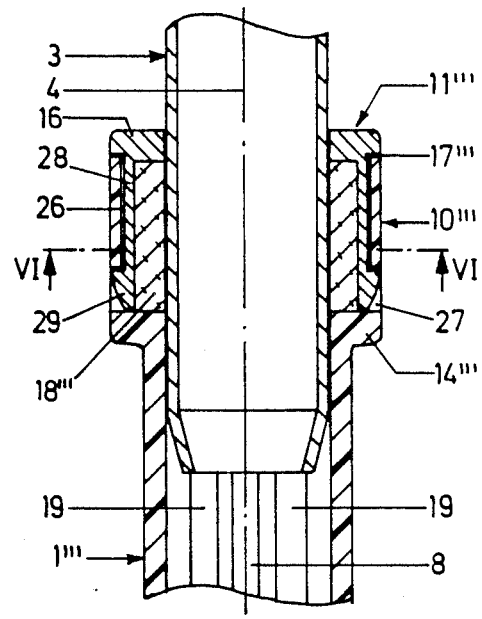
FIG. 5 shows another modified embodiment of a frictional damper with a modified damping housing, in partial longitudinal section.

The frictional damper for the embodiments according to FIGS. 1 to 6 has a tubular housing 1 which is injection moulded in one piece from plastics material. At its free end it is provided with a connecting element 2 in the form of a so-called eye. In the housing 1 a slide 3 is arranged so as to be slidable in the direction of the common longitudinal axis 4 of the housing 1 and slide 3. In the exemplary embodiment according to FIGS. 1 to 6 this slide 3 consists essentially of a relatively thin-walled metal tube. At the outer free end the slide 3 is likewise provided with a connecting element in the form of a so-called eye, the connection being formed for example by a bead 6. By means of its connecting elements 2 and 5 the frictional damper can be articulated on two parts, of which the movements relative to one another are damped. Washing machines are an important and commercially very significant field of application, a connecting element 2 being articulated on the washing unit and a connecting element 5 on the base plate of the washing machine. The slide 3 and housing 1 are rotatable relative to one another about their longitudinal axis 4.

The housing 1 has on its inner wall 7 guide webs 8 which project radially inwards and are parallel to the inner wall and which run essentially over the longitudinal extension of the inner wall 7. These guide webs 8 are arranged at equal angular intervals from one another. In this case there are at least three guide webs; in the exemplary embodiment there are provided four guide webs 8 arranged at 90° intervals from one another. In order to facilitate the introduction of the slide 3 into the housing 1, the slide 3 is fitted with a radial necking 9 at its end opposite its connecting element 5.

At the end opposite the connecting element 2 and on the slide exit side, a receiving section 10 for receiving a damping housing 11 is formed in the housing 1. This receiving section 10 has an essentially circular cylindrical design and an internal diameter greater than the external diameter of the slide 3. In the transitional area between the wall 12 of the housing 1 and the wall 13 of the damping housing 11 there is provided a transitional area serving as a stop shoulder 14.

The damping housing 11 shown in FIG. 1 has a circular cylindrical outer wall 15 provided at one end with a stop flange 16 which projects radially inwards approximately as far as the slide 3 and bears against the latter in a largely play-free, but frictionless manner. The stop flange 16 projects radially outwards to such an extent that, when the damping housing 11 is inserted into the receiving section 10, the flange comes into contact with the front side edge 17 of this receiving section. In this case the outer wall 15 bears against the stop shoulder 14.

In the damping housing 11 there is arranged a damping lining 18 which consists of a strip of foamed plastics material or felt or the like which extends over the entire inner circumference of the damping housing 11, and therefore has an approximately right parallelepiped shape. Closed-cell foamed polyurethane plastics material is preferred for use. The dimensioning of the damping lining 18 can be such that, before the slide 3 is introduced into the housing 1 through the damping housing 11, it projects radially further inwards than equivalent to the external diameter of the slide 3 so that the lining is compressed upon the introduction of the slide 3 whereby contact pressures of varying strengths and thus frictional forces are created depending on the degree of compression. On the other hand, the outer wall 15 of the damping housing 11 can have different internal diameters so that different radial preloading of the damping linings and thus different frictional forces during introduction of the slide 3 are achieved from its point on otherwise identical damping linings 18. The damping housings 11 with the damping lining 18 can be stored, in the indicated variable design for producing different frictional forces, in an appropriately marked form, for example prefabricated in different colours, and then, if required, fitted into the receiving section 10 of the housing 1. They can be axially and firmly secured in the housing together with the slide 3 to prevent slipping or moving out by bonding, ultrasonic welding, rotary welding or even by means of a simple press fit.

Immediately adjacent to the section 10 for receiving the damping housing 11 ventilation slots 19 are formed in the wall 12 of the housing 1 between the guide webs 8, which slots extend over approximately one fifth to one third of the length of the housing 1. If the slide 3 is inserted into the housing 1, it then displaces the air inside the housing 1, this air being forced out, when the slide 3 covers the ventilation slots 19, through narrow channels 20 between the slide 3 and the inner wall 7 of the housing 1, which are each also delimited by the guide webs 8. This results in intensive cooling of the outside of the slide 3.

The exemplary embodiment according to FIG. 2 has a housing 1 identical to the embodiment in FIG. 1 and an identical slide 3. Only the damping housing 11' has a radially inwardly projecting ring-like stop shoulder 21 at its end facing the transient area serving as a stop shoulder 14 so that the damping lining 18' is fixed in the damping housing 11' itself in both directions of the longitudinal axis 4. For production engineering reasons the damping housing 11' is not designed in one piece like the damping housing 11, but in two parts; it is divided at right angles to the longitudinal axis 4, the dividing plane 22 being laid through the outer wall 15'.

In the development according to FIG. 4 the housing 1" comprises a metal tube which is provided at its end with a receiving section 10". The damping housing 11"

consists of two identical housing sections 23 which are placed opposite one another in mirror symmetry in a dividing plane 22. In this case its annular stop shoulders 21 serve firstly as a stop shoulder and secondly as a stop flange, and therefore fix the damping lining 18″ in both directions of the longitudinal axis 4. The damping housing 11″ and damping lining 18″ are axially fixed in the receiving section 10″ by providing the free end of the latter with a radially inwardly directed bead 25 whereby the damping housing 11″ is at the same time pressed against the stop shoulder 14″ of the receiving section 10″. In this case also the above comments on the variation possibilities regarding the thickness of the outer wall 15″ and the damping lining 18″ apply, as has already been previously explained in detail.

The development according to FIGS. 5 and 6 again corresponds largely to that in FIG. 1. Only different measures are provided for securing the damping housing 11‴ in the receiving section 10‴. The wall 13‴ of the receiving section 10‴ has an inner groove 26 which extends from its edge 17‴ as far as the vicinity of the stop shoulder 14‴ and has an outwardly directed opening 27 at its end adjacent to the stop shoulder 14‴. Part of the outer wall 15‴ of the damping housing 11‴ is in the form of a resilient tongue 28 with a locking projection 29. When the damping housing 11‴ is inserted into the receiving section 10‴, the locking projection 29 is pushed through the groove 26 whereby the latter, together with the tongue 28, is pressed inwards while the damping lining 18‴ is correspondingly deformed. When the opening 27 is reached, the locking projection 29 snap engages in the opening whereby the damping housing 11‴ is secured to prevent it from being drawn out of the receiving section 10‴. If the locking projection 29 is pressed from outside inwards through the opening 27, unlocking and thus removal of the damping housing 11‴ and damping lining 18‴ is possible.

Figure 7:
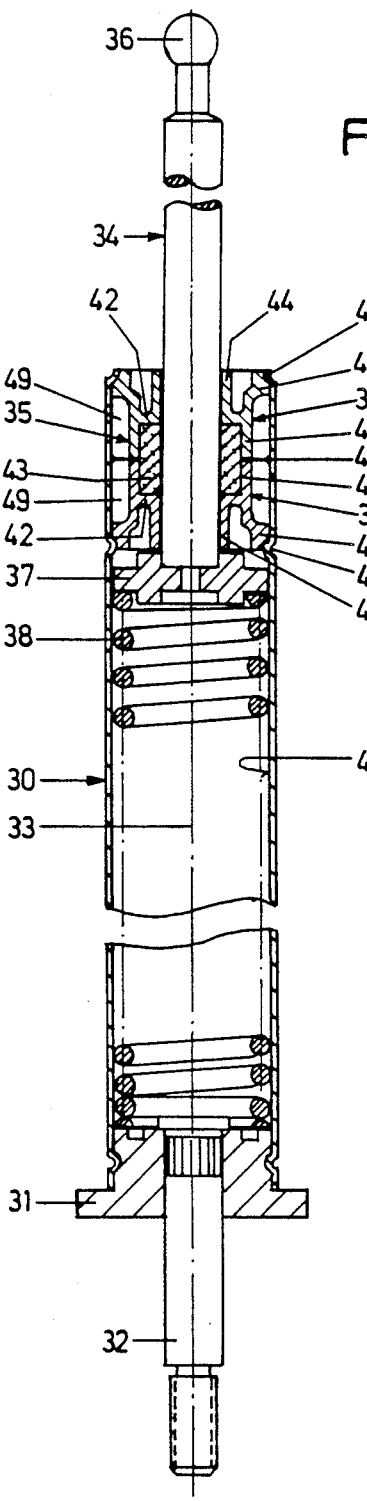
FIG. 7 is a longitudinal section of a frictional damper in the form of a telescopic or shock absorbing leg and having a damping housing in the form of a guide housing.

A frictional damper which has a known fundamental design and is in the form of a shock absorbing leg is shown in FIG. 7. It has a tubular housing 30 which is provided at one end with a sealing plate 31 to which a fastening bolt serving as the connecting element 32 is in turn attached, by means of which fastening bolt the frictional damper can be fixed for example to the base plate of a washing machine. In this case two circular rubber blanks are slipped on to the fastening bolt and, between them, receive the corresponding section of the washing machine base plate. They are retained and preloaded by means of a nut. This is general state of art in this field.

A slide 34 which is in the form of a solid rod is slidably arranged in the housing 30 in alignment with the common longitudinal axis 33, which slide is guided with a damping action in a damping housing 35 serving also as a guide housing. At its free end the slide 34 has a ball as a connecting element 36. Attached to the inner end of the slide 34 is a support plate 37 between which and the sealing plate 31 a helical compression spring 38 is arranged so that the friction damper serves at the same time as a shock absorbing leg, particularly for supporting a washing machine.

The damping housing 35 consists of two identically designed housing sections 39 which, in mirror symmetry with one another, bear against one another with their outer walls 41 in a common dividing plane 40 running at right angles to the longitudinal axis 33. Stop shoulders 42 project radially inwards from the outer wall 41. In the area between the two stop shoulders 42 and the outer wall 41 there is arranged a damping lining 43 which can be designed identically to the damping linings described above. The stop shoulders 42 are followed, in the direction of the longitudinal axis 33, by circular cylindrical guiding faces 44 for the slide 34, which faces produce a relatively great guiding length for the slide 34 because the damping lining 43 is arranged between them. Supporting and centering webs 45 extend axially and radially outwards from the stop shoulders 42, in the area of the outer wall 41, approximately parallel to each of the guiding faces 44, which webs are supported against the inner wall 46 of the housing 30 and fix the damping housing 35 radially at this point. The damping housing 35 is secured on the outside by a flange 47 of the housing 30. To prevent slipping into or out of the housing 30, it is secured by a bead 48 which serves at the same time as a stop for the support plate 37 so that the latter is not pressed against the damping housing 35 under the force of the compression spring 38. In this case also it is regarded that, through appropriate dimensioning of the damping housing 35, that is particularly of its outer wall 41, and/or through the dimensioning of the damping lining 43 or by appropriate selection of material for the damping lining 43 on the otherwise identically designed frictional damper serving as the shock absorbing leg, the frictional condictions can be varied.

The housing sections 39 each have ribs 49 which run parallel to the longitudinal axis 33 on their outer wall 41 and which are supported against the inner wall 41 so that the housing sections 39 are supported radially relative to the housing 30 in a trouble-free manner.

What is claimed is:

1. A frictional damper comprising a tubular housing (1, 1″, 30) with a wall (12) and an inner wall (7) and having a slide (3, 34) which is slidably guided in this housing by guide means (8, 44) in the direction of its longitudinal axis (4, 3) and projects out of an end thereof, the housing (1, 1″, 30) and the slide (3, 34) each being provided with a connecting element (2, 5, 32, 36) at each of their free ends and the housing (1, 1″, 30) having a soft, compressible damping lining (18, 18′, 18″, 18‴, 43) impregnated with lubricant bearing against the slide (3, 34) at its end on a slide exit side, wherein the damping lining (18, 18′, 18″, 18‴, 43) is arranged in a separate damping housing (11, 11′, 11″, 11‴, 35) which is inserted into the tubular housing (1, 1″, 30) from the end on the slide exit side and is fixed axially in this housing in the direction of its longitudinal axis (4, 33).

2. A frictional damper according to claim 1, wherein the damping housing (11, 11′, 11‴) has a stop flange (16) which seals off that end of the tubular housing (1, 30) which is on the slide exit side.

3. A frictional damper according to claim 1, wherein the tubular housing (1, 1″, 30) has a stop shoulder (14, 14″, 14‴, 48) for at least one of the damping housing (11, 11′, 11″, 11‴, 35) and the damping lining (18, 18‴).

4. A frictional damper according to claim 1, wherein the tubular housing (1, 1″) has an enlarged section (10, 10″, 10‴) for receiving the damping housing (11, 11′, 11″, 11‴).

5. A frictional damper according to claim 1, wherein the damping housing (11′, 35) is divided at right angles to the longitudinal axis (4, 33) and fixes the damping lining (18′, 43) in the direction of the longitudinal axis (4, 33) on both sides by means of stop shoulders (21, 42).

6. A frictional damper according to claim 1, wherein the damping housing (11''') is fixed in the direction of the longitudinal axis (4) in the tubular housing (1) by means of a locking connection.

7. A frictional damper according to claim 1, wherein the damping housing (11, 11') is fixed in the tubular housing (1) by means of bonding, welding, press fit or the like.

8. A frictional damper according to claim 1, wherein the damping housing (11'', 35) is retained in the tubular housing (1'', 30) by at least one radially inwardly deformed section (25, 47, 48) of the tubular housing (1'', 30).

9. A frictional damper according to claim 1, wherein said guide means comprises at least three guide webs (8) for the slide (3), which extend parallel to the longitudinal axis (4) and project radially inwards from the inner wall (7), formed on this inner wall (7) of the tubular housing (1).

10. A frictional damper according to claim 1, wherein ventilation slots (19) running parallel to the longitudinal axis (4) are formed in the wall (12) of the tubular housing (1) adjacent to the damping housing (11).

11. A frictional damper according to claim 10, wherein the ventilation slots (19) are arranged between at least three guide webs (8) for the slide (3), which extend parallel to the longitudinal axis (4) and project radially inwards from the inner wall (7) and which are formed on this inner wall (7) of the tubular housing (1).

12. A frictional damper according to claim 1, wherein the damping lining (18, 18', 18'', 18''', 43) is made of foamed plastic material.

13. A frictional damper according to claim 1, wherein the damping housing (35) is in the form of a guide housing and has said guide means in the form of guide faces (44) for the slide (34) on both sides of the damping lining (43).

14. A frictional damper according to claim 1, wherein the damping housing (35) is supported radially in the tubular housing (30) by way of supporting and centering webs (45).

15. A frictional damper according to claim 6, wherein the locking connection is detachable.

16. A frictional damper according to claim 1, wherein the damping housing (11, 11', 11'', 11''', 35) is formed as a guide housing.

17. A frictional damper according to claim 1, wherein the damping lining is made of felt.

18. A frictional damper comprising a tubular housing (1, 1'', 30) with a wall (12) and an inner wall (7) and having a slide (3, 34) which is slidably in contact with and guided in this housing by guide means (8) formed on said inner wall (7), in the direction of its longitudinal axis (4, 3) and projects out of an end thereof, the housing (1, 1'', 30) and the slide (3, 34) each being provided with a connecting element (2, 5, 32, 36) at each of their free ends and the housing (1, 1'', 30) having a soft, compressible damping lining (18, 18', 18'', 18''', 43) impregnated with lubricant bearing against the slide (3, 34) in the area of its end on a slide exit side, wherein the damping lining (18, 18', 18'', 18''', 43) is arranged in a separate damping housing (11, 11', 11'', 11''', 35) which is inserted into the tubular housing (1, 1'', 30) from the end on the slide exit side and is fixed axially in this housing in the direction of its longitudinal axis (4, 33).

19. A frictional damper according to claim 18, wherein said guide means comprises at least three guide webs (8) which extend parallel to the longitudinal axis (4) and project radially inwardly from said inner wall (7).

20. A frictional damper comprising a tubular housing having a wall (12) with an inner surface (7), a first open end and a second end,
- a slide (3, 34) slidably guided in said housing in the direction of its longitudinal axis and projecting out of said first open end of said housing,
- a connecting element (2, 32) at said second end of said housing, and a connecting element (5, 36) at a free end of said slide,
- a separate, pre-fabricated damping housing (11, 11', 11'', 11''', 35) inserted into and fixed within said housing at its first open end, said separate pre-fabricated damping housing containing a soft, compressible damping lining (18, 18', 18'', 18''', 43) impregnated with lubricant and bearing against said slide (3, 34), and
- guide means (8, 44) for slidably guiding said slide (3, 34) in said housing in the direction of its longitudinal axis, said guide means (8, 44) being separate from said damping lining.

* * * * *